United States Patent
Tambaram Kailasam et al.

(10) Patent No.: US 10,064,130 B2
(45) Date of Patent: Aug. 28, 2018

(54) SYSTEM AND METHOD FOR SHARING MEASUREMENT RESULTS IN MULTI-SIM DEVICES

(71) Applicant: QUALCOMM Incorporated, San Diego, CA (US)

(72) Inventors: Sundaresan Tambaram Kailasam, San Diego, CA (US); Uzma Khan Qazi, San Marcos, CA (US); Sunil Kumar Gurram, San Marcos, CA (US); Harish Venkatachari, Sunnyvale, CA (US); Shashank V. Maiya, Milpitas, CA (US); Bhupesh Manoharlal Umatt, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/255,794

(22) Filed: Sep. 2, 2016

(65) Prior Publication Data
US 2018/0070303 A1 Mar. 8, 2018

(51) Int. Cl.
*H04B 17/318* (2015.01)
*H04L 29/06* (2006.01)
(Continued)

(52) U.S. Cl.
CPC ...... *H04W 52/0209* (2013.01); *H04B 17/318* (2015.01); *H04L 63/0853* (2013.01);
(Continued)

(58) Field of Classification Search
CPC ........... H04W 52/0209; H04W 40/005; H04W 76/048; H04W 8/183; H04W 36/14;
(Continued)

(56) References Cited

U.S. PATENT DOCUMENTS

2005/0215259 A1* 9/2005 Cheng ............ H04H 20/72
455/452.2
2014/0342728 A1 11/2014 Dhanda et al.
(Continued)

FOREIGN PATENT DOCUMENTS

WO 2012041735 A1 4/2012
WO 2015180126 A1 12/2015

OTHER PUBLICATIONS

International Search Report and Written Opinion—PCT/US2017/047933—ISA/EPO—dated Nov. 3, 2017.

*Primary Examiner* — James Yang
(74) *Attorney, Agent, or Firm* — Procopio, Cory, Hargreaves & Savitch LLP/Qualcomm

(57) ABSTRACT

A system and method for reducing power consumption in a mobile communication device is disclosed. The device may have multiple subscriber identity modules (SIMs), wherein each SIM is associated with a subscription. The method may include measuring received signal strengths from one or more cells for use with a first subscription. The method may also include sharing the search results for use with a second subscription. The first subscription and the second subscription may be associated with the same or difference cells and radio access technologies. The method may also include refraining from measuring the received signal strengths of the one or more cells for use with the second subscription, based on the search results.

24 Claims, 6 Drawing Sheets

(51) Int. Cl.
*H04W 40/00* (2009.01)
*H04W 52/02* (2009.01)
*H04W 76/28* (2018.01)
*H04W 76/04* (2009.01)
*H04W 48/16* (2009.01)
*H04W 88/06* (2009.01)
*H04W 8/18* (2009.01)

(52) U.S. Cl.
CPC ........... *H04L 69/28* (2013.01); *H04W 40/005* (2013.01); *H04W 48/16* (2013.01); *H04W 76/048* (2013.01); *H04W 76/28* (2018.02); *H04W 8/183* (2013.01); *H04W 88/06* (2013.01)

(58) Field of Classification Search
CPC ... H04W 88/06; H04W 48/18; H04W 72/005; H04B 17/318; H04L 63/0853; H04L 69/28; H04H 20/72; H04H 60/91; H04H 40/18
See application file for complete search history.

(56) References Cited

U.S. PATENT DOCUMENTS

| | | | |
|---|---|---|---|
| 2015/0141012 A1* | 5/2015 | Ramkumar | H04W 48/20 455/435.3 |
| 2015/0264640 A1 | 9/2015 | Feng et al. | |
| 2017/0048773 A1* | 2/2017 | Miao | H04W 8/183 |

* cited by examiner

SYSTEM AND METHOD FOR SHARING MEASUREMENT RESULTS IN MULTI-SIM DEVICES

BACKGROUND

Technical Field

This disclosure relates to devices having more than one subscriber identity module (SIM). More specifically, this disclosure relates to sharing cell measurement results between SIMs in a mobile device.

Related Art

A mobile or wireless communication device, such as a mobile phone device or a smart phone, may include two or more Subscriber Identity Modules (SIMs). Each SIM may correspond to at least one subscription via a Radio Access Technology (RAT). Such a mobile communication device may be a multi-SIM mobile communication device. In a Multi-SIM-Multi-Active (MSMA) mobile communication device, all SIMs may be active at the same time. In a Multi-SIM-Multi-Standby (MSMS) mobile communication device, if any one SIM is active, then the rest of the SIM(s) may be in a standby mode. The RATs may include, but are not limited to, Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like, Universal Terrestrial Radio Access (UTRA), Global System for Mobile Communications (GSM), Code Division Multiple Access 1× Radio Transmission Technology (1×), General Packet Radio Service (GPRS), Wi-Fi, Personal Communications Service (PCS), and other protocols that may be used in a wireless communications network or a data communications network.

In mobility scenarios in which a multi-SIM mobile communication device is mobile, a network (e.g., a LTE network) corresponding to a first subscription (e.g., enabled by a first SIM) may request the mobile communication device to perform measurements or searches for various inter-RAT and/or inter-frequency neighbors for handover and/or reselection purposes. For instance, the network may send multiple measurement configuration messages via back-to-back Radio Resource Control (RRC) Over-The-Air (OTA) messages or SIB updates within a relatively short period of time. The manner in which the measurement configuration messages are processed may considerably impact performance on both the first subscription and second subscription (e.g., enabled by a second SIM), as well as power consumption.

The mobile communication device may perform a cell search to determine which RATs are available and their associated characteristics. Such searches may occur in a number of scenarios. For example, after powering on, a mobile communication device may perform a cell search to identify one or more candidate base stations (BSs) and one or more candidate RATs. In addition, a cell search may also be performed after the mobile communication device enters an out-of-service (OOS) state.

The cell search may include obtaining system parameters for each candidate BS. Based on the system parameters for the candidate BSs, the wireless communication device may subsequently perform cell selection to determine a suitable BS on which to acquire a communication network and camp.

During a cell search, the full frequency band supported by a mobile communication device may be scanned. The mobile communication device may measure the strength of the each received signal on channels in the supported frequency band and identify any BS transmitting a sufficiently strong signal as a candidate BS. As such, the mobile communication device may obtain system parameters for many candidate BSs, which may prolong the cell search.

In a multi-SIM mobile communication device, acquisition of a communication network on each subscription may be performed sequentially after the multi-SIM mobile communication device is powered on. Each subscription may perform its own cell search or measurement search to discover or update measurement information on each available cell. However, existing processes may be inefficient in such scenarios. Consequently, searches in a multi-SIM mobile communication device may be redundant, unnecessarily increasing power consumption.

SUMMARY

An aspect of the disclosure provides a method for reducing power consumption in a mobile communication device. The mobile device may have SIMs, each SIM of the multiple SIMs being associated with a subscription. The method may include measuring, by a first processor associated with a first subscription, received signal strengths from one or more cells for use with the first subscription, to determine search results indicating availability of the one or more cells, the first subscription being associated with a first cell having a first radio access technology. The method may also include sharing the search results with a second processor associated with a second subscription, the second subscription being associated with a second cell having a second radio access technology. The method may also include validating the search results for use with the second subscription. The method may also include refraining from measuring, by the second processor, the received signal strengths of the one or more cells for use with a second subscription, based on the search results.

Another aspect of the disclosure provides a device for reducing power consumption in a mobile communication. The device may have SIMs, each SIM of the multiple SIMs being associated with a subscription. The device may include a first processor. The first processor may measure received signal strengths from one or more cells for use with a first subscription, to determine search results indicating availability of the one or more cells, the first subscription being associated with a first cell having a first radio access technology. The first processor may also share the search results with a second processor associated with a second subscription, the second subscription being associated with a second cell having a second radio access technology. The device may also have a second processor. The second processor may evaluate the search results for use with the second subscription. The second processor may also refrain from measuring the received signal strengths of the one or more cells for use with the second subscription, based on the search results.

Another aspect of the disclosure provides an apparatus for reducing power consumption in a mobile communication device. The device may have multiple SIMs, each SIM of the multiple SIMs being associated with a subscription. The apparatus may have means for measuring received signal strengths from one or more cells for use with a first subscription, to determine search results indicating availability of the one or more cells, the first subscription being associated with a first cell having a first radio access technology. The apparatus may also have means for sharing the search results for use with a second subscription, the second subscription being associated with a second cell having a second radio access technology. The apparatus may also have means for validating the search results for use with the second subscription. The apparatus may also have means for refraining from measuring the received signal strengths of the one or more cells for use with the second subscription, based on the search results.

Another aspect of the disclosure provides a nontransitory computer-readable medium for reducing power consumption in a mobile communication device. The device may have one or more processors associated with multiple SIMs, each SIM of the multiple SIMs being associated with a subscription. The nontransitory computer-readable medium may have instructions that when executed by the one or more processors cause the device to measure received signal strengths from one or more cells for use with a first subscription, to determine search results indicating availability of the one or more cells, the first subscription being associated with a first cell having a first radio access technology. The instructions may also cause the device to make the search results available for use with a second subscription, the second subscription being associated with a second cell having a second radio access technology. The instructions may also cause the device to evaluate the search results for use with the second subscription. The instructions may also cause the device to refrain from measuring the received signal strengths of the one or more cells for use with the second subscription, based on the search results.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

The detailed description set forth below, in connection with the accompanying drawings, is intended as a description of some embodiments and is not intended to represent the only embodiments in which the disclosure may be practiced. The detailed description includes specific details for the purpose of providing a thorough understanding of the embodiments. In some instances, well-known structures and components are shown in simplified form for brevity of description. Furthermore, various omissions, substitutions, and changes in the form of the example apparatuses and methods described herein may be made without departing from the scope of protection.

Figure 1:
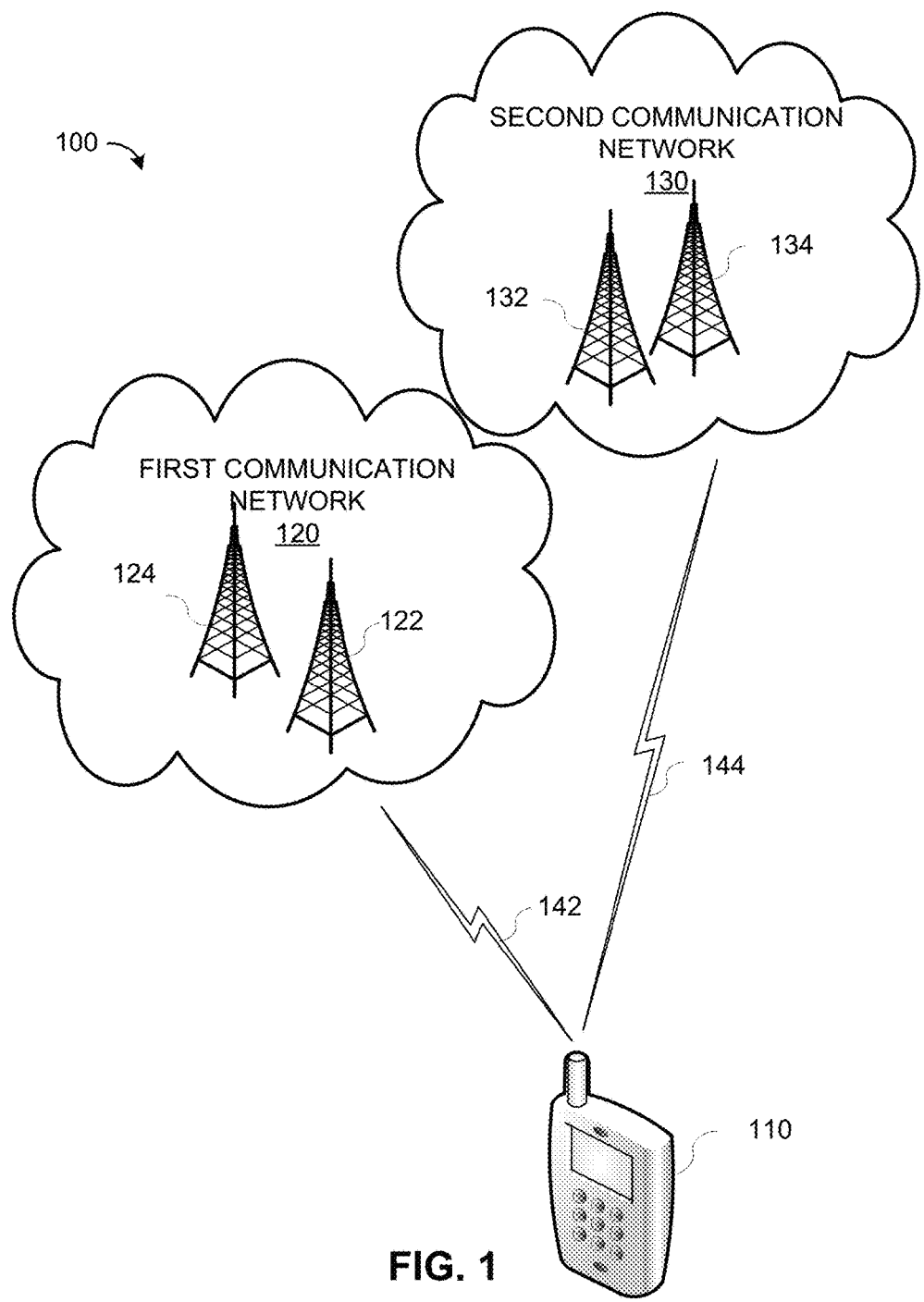
FIG. 1 is a diagram illustrating a network environment.

FIG. 1 is a diagram illustrating a network environment. A network environment 100 may have a mobile communication device (device) 110 in communication with a first communication network 120 and a second communication network 130. The device 110 may communicate with the first communication network 120 using a first subscription 142. The device 110 may also communicate with the second communication network 130 using a second subscription 144. As used herein, the subscription 142 and the subscription 144 may be referred to as a "SUB" or "SUBs." As used herein, a subscription may refer to the relationship between the mobile communication device 110 and a particular mobile network operator (MNO). The subscription may be a set of parameters governing the association between the mobile communication device 110 and the MNO. In some examples, only the mobile communication device 110 with a specific identity and/or operating parameters may use a given subscription. Such identity information may be contained on a SIM.

In some embodiments, the mobile communication device 110 may have multiple SIMs. The SIM may be embodied on a card (i.e., SIM card). Therefore the device 110 may be referred to herein as a multi-SIM mobile communication device or multi-SIM device 110. This may enable the device 110 to communicate with the first communication network 120 and the second communication network 130 simultaneously. In some embodiments, the device 110 may also communicate with at least one other communication network (e.g., a third, fourth, or $n^{th}$ communication network, where n is an integer). In some embodiments, the first communication network 120 and the second communication network 130 may each be, for example, but not limited to, a wireless or mobile communication network.

The first communication network 120 may include a plurality of base stations (BS) including, for example, but not limited to, a first BS 122 and a second BS 124. The second communication network 130 may also include a plurality of BSs, including, for example, but not limited to, a third BS 132 and a fourth BS 134. It should be appreciated that the network environment 100 may include any number of communication networks, mobile communication devices, and BSs without departing from the scope of the disclosure.

The device 110 may be booted or powered on and subsequently attempt to acquire the first communication network 120 on the first SUB 142. Alternately, the device 110 may have previously acquired the first communication network 120 but may be in an out of service (OOS) state on the first SUB 142. For example, the mobile communication device 110 may encounter a system loss or a system access failure on the first SUB 142.

As a result, the mobile communication device 110 may perform a cell search on the first SUB 142 to identify one or more candidate BSs. The device 110 may select a suitable BS from the candidate BSs on which to acquire the first communication network 120 and camp. For example, the device 110 may perform a cell search and identify the first BS 122 and the second BS 124 as candidate BSs. At the same time, the device 110 may have acquired the second communication network 130 and may be camped on the third BS 132 or on the fourth BS 134.

Alternately, the device 110 may have acquired the first communication network 120 and may be camped on the first BS 122 or the second BS 124. Meanwhile, the device 110 may perform a cell search via the second SUB 144 and identify the third BS 132 and the fourth BS 134 as candidate BSs. For example, the device 110 may perform a cell search on the second SUB 144 in order to acquire the second communication network 130 after the device 110 is powered on. The device 110 may also perform a cell search on the second SUB 144 if the device 110 is in an OOS state on the second SUB 144.

It should be appreciated that a cell search on the first SUB 142 may be performed independently of a cell search on the second SUB 144. Furthermore, the device 110 may perform a cell search on the first SUB 142 and a cell search on the second SUB 144 in the same or a different manner.

Figure 2:
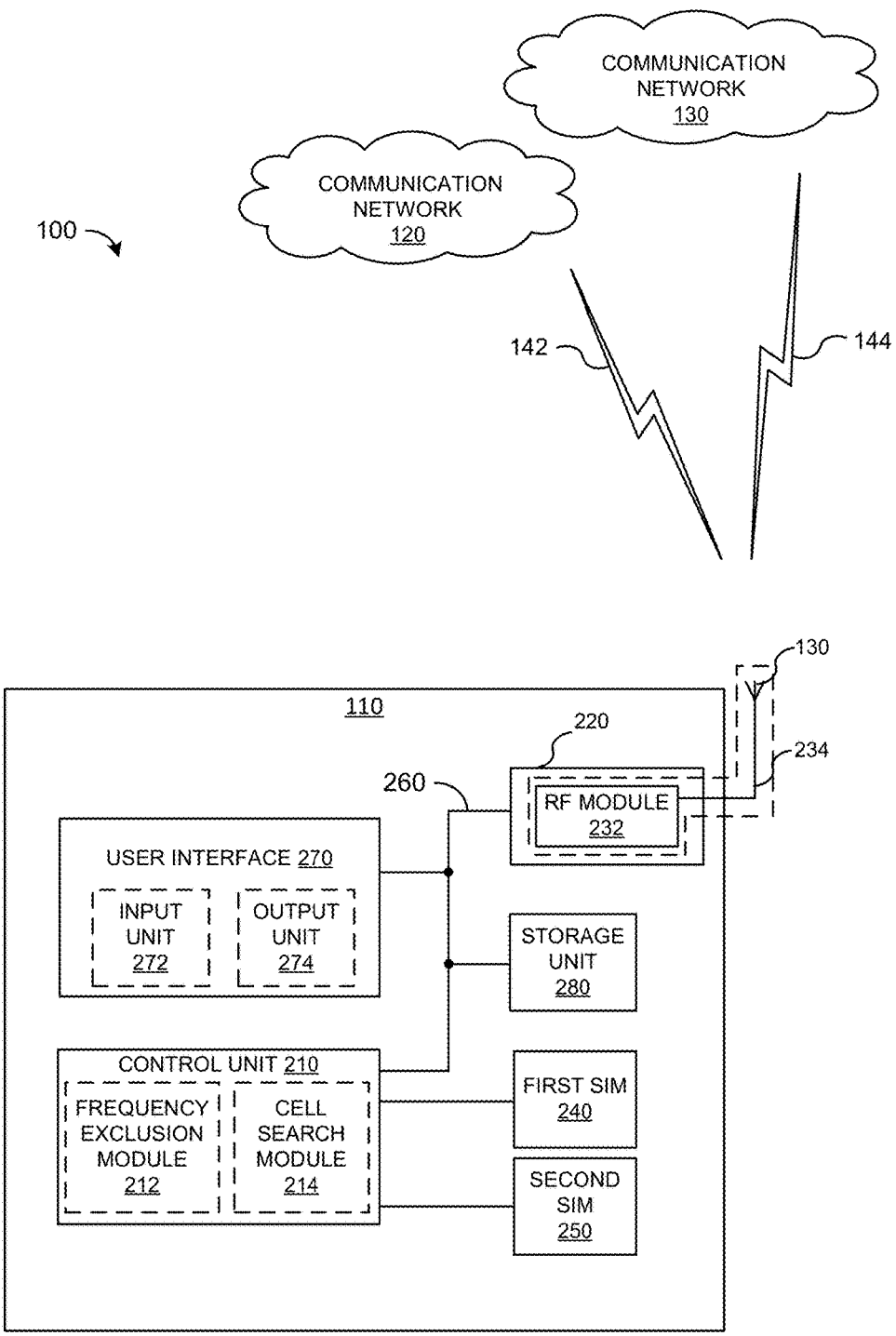
FIG. 2 is a functional block diagram of an embodiment of the mobile communication device of FIG. 1.

FIG. 2 is a functional block diagram of an embodiment of the mobile communication device of FIG. 1. In some embodiments, the device 110 may be any device capable of wirelessly communicating with one or more communication networks. In some embodiments, the device 110 may be, for example, but not limited to, a smartphone, a tablet PC, or a laptop computer.

The device 110 may have a control unit 210. In some embodiments, the control unit 210 may have, for example, one or more processors, microprocessors, or microcontrollers. The control unit 210 may be configured to control the overall operation of the device 110. In some embodiments, the control unit 210 may have a frequency exclusion module 212 and a cell search unit 214. The cell search unit 214 may conduct cell or network availability searches in concert with the frequency exclusion module 212. In some embodiments, the cell search unit 214 may return quality of service (QoS) information, received signal strength indication (RSSI), other received energy levels, or additional relevant information about available cells or their associated signaling.

In some embodiments, the control unit 210 may selectively exclude certain frequencies (via the frequency exclusion modules 212) when performing a cell search associated with the first SUB 142 (FIG. 1).

In some embodiments, the first communication network 120 and the second communication network 130 may be associated with different mobile network operators (MNOs). Thus, the control unit 210 may be configured to exclude frequencies that are assigned to BSs in the second communication network 130 when performing a cell search on the first SUB 142. For example, the control unit 210 may exclude the frequency of the carrier used by the BS (e.g., the third BS 132 or the fourth BS 134) on which the device 110 is camped using the second SUB 144, when performing the cell search on the first SUB 142. The control unit 210 may also exclude frequencies used by one or more BSs that are determined to be inter-frequency neighbors of the BS on which the device 110 is camped (using the second SUB 144) when performing the cell search. For example, an inter-frequency neighbor of the third BS 132 may be a nearby BS (e.g., the fourth BS 134) that is assigned to use a different frequency on a same subscription.

In some embodiments, the control unit 210 may be further configured to exclude frequencies that are assigned to BSs (e.g., the first BS 122 and the second BS 124) in the first communication network 120 when performing a cell search on the second SUB 144.

The device may have a communication unit 220. The device 110 may perform communication functions with the first communication network 120 and the second communication network 130, for example via the communication unit 220. The communication unit 220 may have at least one modulator-demodulator ("modem") or perform the functions of a modem as needed for communication with, for example, the first communication network 120 and the second communication network 130. The device 110 is shown to include a single communication unit 220; however, in some embodiments the device 110 may include additional communication units 220 as required.

The communication unit 220 may have a radiofrequency (RF) chain 230 (shown in dashed lines). The RF chain 230 may have, for example, an RF module 232 coupled to at least one antenna 234. In some examples, the communication unit 220 and/or the RF module 232 may have one or more transmitters, receivers, or transceivers, as required. The device 110 may transmit and receive communications via the communication unit 220 and more specifically the RF module 232 and the one or more antenna 234. The communication unit 220 may also have other components required for data transmission and reception or other kinds of communication.

In some embodiments, the device 110 may also have a first SIM 240 and a second SIM 250. The first SIM 240 and the second SIM 250 may be embodied as a hardware card (e.g., flash memory) that contains, for example, subscription and/or identity information usable by the control unit 210 for communications associated with the first SUB 142 and the second SUB 144. The first SIM 240 and/or the second SIM 250 may further have one or more processors or microprocessors that, along with the subscription and identification information, allow the device 110 to communication on the communication networks 120, 130. The control unit 210 may use the first SIM 240 to associate the device 110 with the first SUB 142 (via the RF chain 230) on the first communication network 120. The control unit 210 may also use the second SIM 250 to associate the device 110 with the second SUB 144 (via the RF chain 230) on the second communication network 130. The first SIM 240 and the second SIM 250 may associate with their respective communication networks 120, 130 simultaneously.

Each of the first SIM 240 and the second SIM 250 may be associated with, for example an individual processor or microprocessor (e.g., a first processor and a second processor) within the control unit 210. The first processor and the second processor may also be processor instantiations of the control unit 210 responsible for the control of communications associated with one of a number of subscriptions using a respective SIM. While the control unit 210 and the processors contained therein control the operations of the device 110, for ease of description the first SIM 240 and the second SIM 250 may be described herein as the entity or entities performing specific actions. For example, the first SIM 240 or the second SIM 250 may be characterized as, for example, "performing a cell search," "making a request," "sending a response," or "sharing results," however it should be appreciated that the control unit 210 or the respective processors may be the components actually responsible for performing or controlling such functions. Additionally, various "SUBs" (i.e., subscriptions) may be characterized as "sharing" results. For example, the individual SUBs, as particular relationships between the mobile communication device 110 having a SIM usable with a specific MNO, for example, may "share" information with another SUB using a different SIM with a different MNO.

In some embodiments, the first communication network 120 and the second communication network 130 may be associated with different MNOs. Additionally, the first communication network 120 and the second communication network 130 may each support the same or different radio access technologies (RATs), including but not limited to Wideband Code Division Multiple Access (WCDMA), Global System for Mobile communications (GSM), Long Term Evolution (LTE), and Time Division-Synchronous Code Division Multiple Access (TD-SCDMA).

In some embodiments, the device 110 may be a multi SIM multi standby (MSMS) mobile communication device using one or more of the communication networks 120, 130. The device 110 may also be a multi SIM multi active (MSMA) mobile communication device using one or more of the communication networks 120, 130.

The device 110 may also have a user interface 270 for receiving user input and providing output. In some embodiments, the user interface 270 may have an input unit 272. The input unit 272 may be, for example, a keyboard or a touch screen or panel. The user interface 270 may also have an output unit 274. The output unit 274 may be, for example, a liquid crystal display (LCD) or a light emitting diode (LED) display. Other types or forms of input and output units may also be used without departing from the scope of the disclosure.

The device 110 may also have a storage unit 280. The storage unit 280 may be coupled to the control unit 210. The storage unit 280 may have one or more memory units configured to store application programs, application data, and user data. In some embodiments, at least some of the application programs stored at the storage unit 280 may be executed by the control unit 210 for the operation of the device 110. The control unit 210 may also store QoS and other available information about available cells within the storage unit 280. The control unit 210 may further cause such information to be shared between the first SIM 240 and the second SIM 250 or the active SUB and the passive SUB or their associated processors, as described below. This may allow, for example, the first SIM 240 to share information (such as cell search results/information) with the second SIM 250. As used herein, search results and other related information may be shared between the different SIMs or SUBs and may be described as such. However, as the first SIM 240 and the second SIM 250 may be hardware, the control unit 210 may be causing the SIMs/SUBs to perform the actions (e.g., the searching, measuring, sharing, etc.) described below.

The device 110 may also have a communications bus 260. The communications bus 260 may operably couple the various components of the device 110. For example, the control unit 210 may be operably coupled to each of the first SIM 240, the second SIM 250, the user interface 270, and the storage unit 280 via the communications bus 260. In some other embodiments, the various components of the device 110 may have a different configuration with respect to the communications bus 260.

The device 110 may have multi-subscription capabilities such as, for example, Dual SIM, Triple SIM, (e.g., multi-SIM) etc. This may allow the device 110 to establish communications with the first communication network 120 via the SUB 142 using the first SIM 240 and with the second communication network 130 via the SUB 144 using the second SIM 250. In embodiments where multiple subscriptions or multiple SIMs are present and operating simultaneously, modem power may increase dramatically because more than one subscription is in use at the same time. Accordingly, there are fewer chances for power saving operations such as sleep or idle modes, for example. Therefore maximizing the efficient use of power across multi-SIM devices is important.

Figure 3:
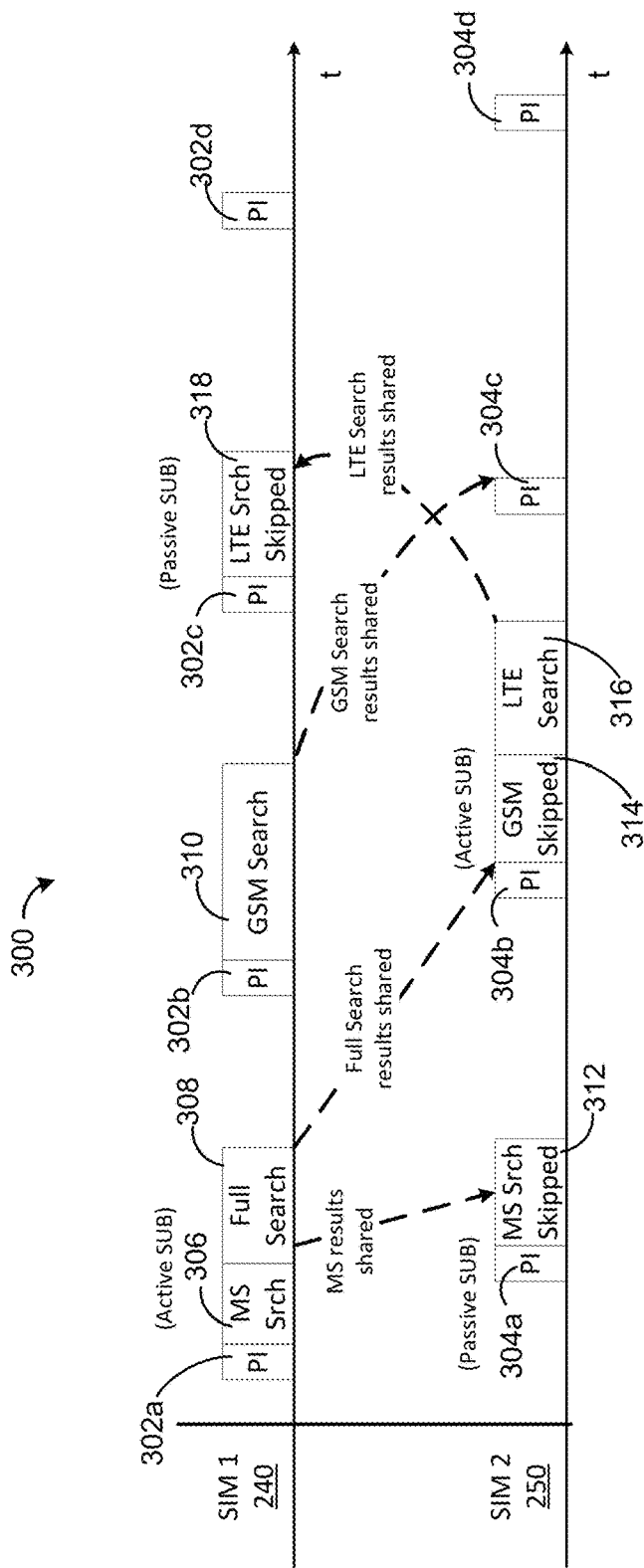
FIG. 3 is a graphical representation of the operation of the subscriptions of FIG. 2.

As disclosed herein, the multi-subscription support in a user equipment (UE), such as the device 110, may provide users an option to insert same-operator (e.g., MNO) SIM cards in all slots, or different-operator SIM cards. The description contained herein may relate to multi-SIM devices (e.g., the device 110) when more than one of the applicable subscriptions/SIMs are in IDLE mode or when there is no active radio bearer with the communication network 120, 130. In some other embodiments, the processes and methods disclosed herein may be used in the CONNECTED mode, when one or more of the subscriptions has an active radio resource control (RRC) connection FIG. 3 is a graphical representation of the operation of the subscriptions of FIG. 2. A plot 300 is shown depicting an embodiment of network search and results sharing between the first SIM 240 and the second SIM 250 and their respective SUBs 142, 144 over time (t). Time (t) is plotted on the horizontal axis. The control unit 210 may allow search/measurements results for a given network, a frequency, or group of frequencies or frequency bands to be shared between first SIM 240 and the second SIM 250 and their associated SUBs. The network, a frequency, group of frequencies, or frequency bands may correspond to, for example, one or more radio access technologies on which the first SIM 240 and the second SIM 250 are camped. The network, frequency, group of frequencies, or frequency bands may also correspond to, for example, one or more radio access technologies that are assigned as neighbors by the network to the camped cell. While only the first SIM 240 and the second SIM 250 are depicted in the plot 300, the same or a similar communication scheme may be used in a triple-SIM or multi-SIM system having two or more SIMs or associated SUBs.

The dual-, triple-, or multi-SIM system may also share across radio access technologies as well. For example, the device 110 (and more specifically, the first SIM 240 and the second SIM 250) may use one or more of, for example, WCDMA, GSM, and LTE networks. Thus, the first SIM 240 and the second SIM 250 may have capabilities on disparate radio technologies, such as, for example, G+G, G+L, W+L, L+L, etc., where G refers to GSM, W refers to WCDMA, and L refers to LTE. With the multiple radio access technologies present and in use by the device 110, power consumption (specifically power consumption by the modem and/or the cell search unit 214) may increase significantly over a device with a single SUB. Accordingly, with increased network searches and evaluation completed by the device 110 for each of the two or more SIMs/SUBs, there are fewer opportunities for power-saving routines such as XO shutdown or modem power collapse. In some examples, modem power collapse may refer to power or current-saving routines or processes implemented by the device 110. In some examples, XO shutdown may be one of the processes that occurs as part of modem power collapse. Specifically, XO shutdown may refer to powering down a main oscillator and disabling oscillator clocks within the modem. Therefore, saving power across multi-SIM systems such as the device 110 may be an important aspect of device 110 operations.

In some embodiments, the first SIM 240 may have a paging interval (PI) 302. The PI 302 may be similar to a PI of an LTE communication system, for example. The PI 302 may also be coincident with the discontinuous reception (DRX) cycle. In some examples, PI periodicity may be determined by the DRX cycle of the cell on which a SIM is camped. FIG. 3 shows multiple PIs 302a, 302b, 302c, 302d but may be referred to collectively as PIs 302. The second SIM 250 may also have a PI 304, labeled as PIs 304a, 304b, 304c, 304d (collectively, PIs 304). The PIs 304 may be similar to the PIs 302 but may have distinct intervals or time periods.

Following the PI 302a, the first SIM 240 or its associated processor(s), (e.g., a first processor) may conduct a measurement search (MS) 306. During the MS 306, the first SIM 240 may search or monitor a received signal strength or other receivable energy for available cells. The available cells may already be known to the device 110 or the first SIM 240. In some examples, the MS 306 may be performed for known cells or previously-detected cells to measure the available energy for each cell. The first SIM 240 may also conduct a full search 308. The full search 308 may occur after (or before) the MS 306. The full search 308 may be a more thorough search than the MS 306 when the first SIM 240 may discover additional or previously unknown cells and their respective energy or received signal strengths.

The searches performed by the first SIM 240 on a first SUB may be shared with the second SIM 250 on a second SUB or its associated processors (e.g., a second processor). Sharing the search results and measurements may allow one SIM (or SUB) to save power by eliminating, refraining from conducting a given search. Accordingly, one SIM may be active and the other may be passive, depending on which SIM is performing a search.

As used herein, the SIM or processor (e.g., the control unit 210) conducting a search (e.g., the first SIM 240 performing the MS 306 and the full search 308) and sharing the respective results may be referred to as the "active SUB." Additionally, the SIM that is not performing a search, or that receives the shared search results from the active SUB, may be the "passive SUB." Accordingly, once the MS 306 is complete, the first SIM 240 corresponds with the active SUB and may share the search results with the second SIM 250, corresponding to the passive SUB (as shown by the dashed line). Therefore, the second SIM 250 may skip its own MS search 312, saving power. The first SIM 240 may also share the results of the full search 308 (as shown by the dashed line), further reducing the power requirements of the second SIM 250. Since the full search 308 is shared, the second SIM 250 may skip, for example, a GSM search 314 and conduct an LTE search 316 instead. As shown, the searches and the shared results may be scheduled as needed and alternated to maximize power-saving between operations performed by the first SIM 240 and the second SIM 250. It should be appreciated that the order of the searches is not intended to limit the scope of the disclosure. Any order of searches may be implemented as needed by the device 110. It should also be appreciated that while the SIMs are described as performing the noted operations, one or more processors associated with the control unit 210 may actually perform such operations.

The first SIM 240 may conduct repeated cycles of such searches for multiple different radio access technologies at the end of each PI 302 as the active SUB. For example, the first SIM 240 may perform a GSM search 310 for GSM-capable cells. As the active SUB, the first SIM 240 may share the results of the GSM search 310 with the passive SUB (e.g., the second SIM 250).

At the end of the PI 304b, the second SIM 250 may skip the GSM search 314 given that it received the results of the full search 308 from the first SIM 240. The second SIM 250 may then conduct, for example, the LTE search 316 for LTE capable cells. In this sense, the second SIM 250 then corresponds to the active SUB. The second SIM 250 may then share the results of the LTE search 316 with the first SIM 240 alleviating the need for the first SIM 240 to conduct a similar search, and skip 318 the LTE search.

In some embodiments, both the first SIM 240 and the second SIM 250 may be camped on the same Public Land Mobile Network (PLMN), frequency, or primary scrambling code (PSC). Therefore, the information contained in the system information block (SIB) broadcasted by the network (e.g., the communication network 120 or the communication network 130) is same for both (or all) of the SUBs. This may provide flexibility to share the neighbor search and measurement results (e.g., results of the MS 306) available from active SUB to passive SUB. This may save both time and power for the device 110 which may have been otherwise consumed by those searches. While only the two SUBs are described, the same implementation is also applicable to multiple subscription and multi-SIM devices.

In some examples, saving search time may enable shorter wakeup duration, assuming the passive SUB wakes up only to decode a paging message during a respective PI (e.g., the PI 302, the PI 304). Shorter wakeup duration may increase modem power collapse time thereby increasing the modem power savings.

Therefore, the search results may be shared across SUBs to reduce power requirements of the first SIM 240 and the second SIM 250 or their associated processor(s). While only two SUBs are described in connection with FIG. 3, it should be appreciated that the results sharing may be implemented in systems having any number of SUBs and related SIMs within the device 110.

In some embodiments, a similar method may be used when all of the SUBs (e.g., the first SIM 240 and the second SIM 250) are camped on different PLMNs or cells, but have at least one neighbor frequency in common in the same PLMN or in an equivalent PLMN list. An equivalent PLMN list may be provided for each SUB which defining the frequencies on which the SUB is allowed to camp. This neighbor PLMN information may be obtained through reading a SIB18 broadcasted by the network. In some examples, the SIB18 may be an information block broadcast by the cell carrying PLMN identities of neighboring cells that may be used by the device 110 in IDLE or in CONNECTED mode.

Figure 4:
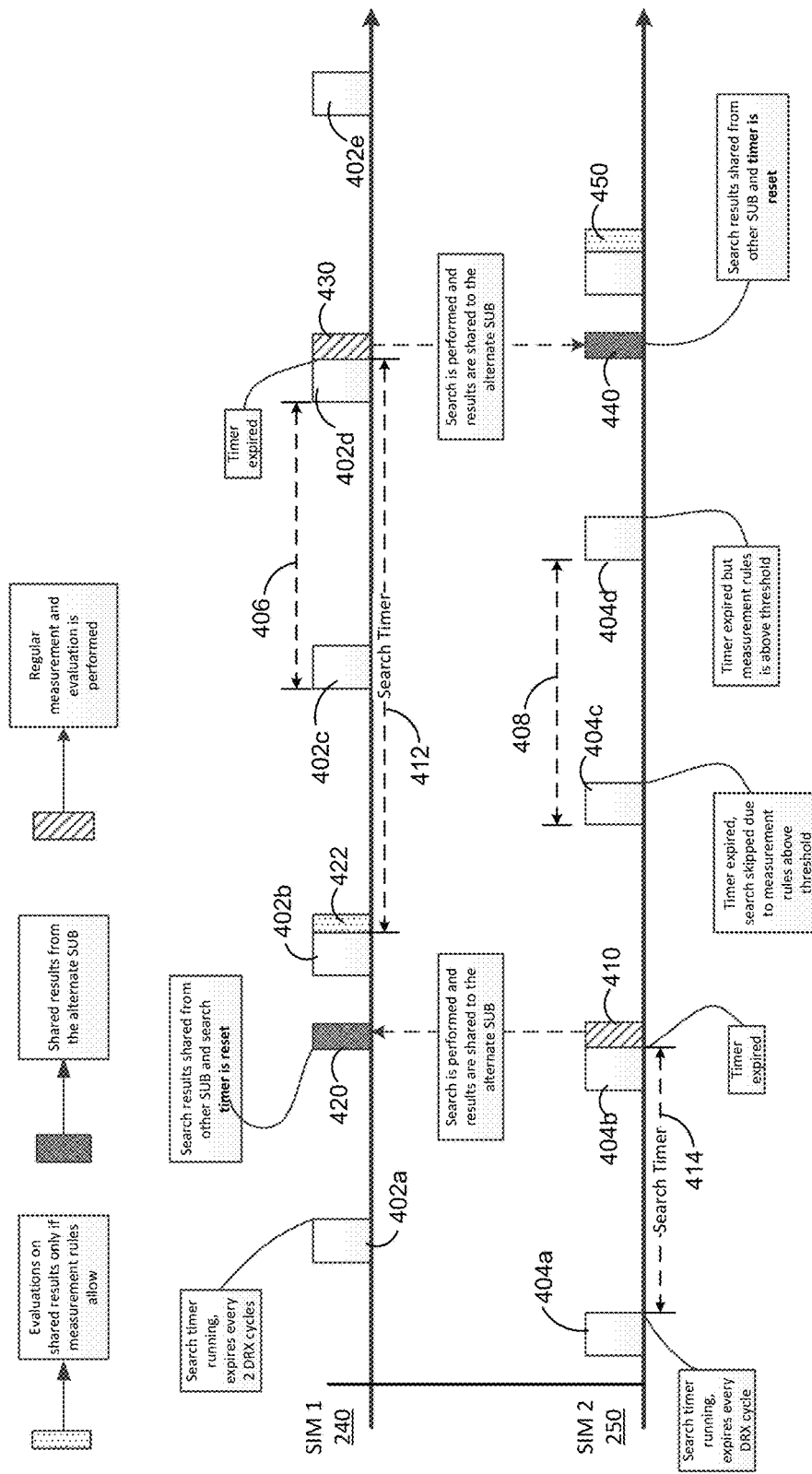
FIG. 4 is a graphical representation of proactive sharing between the SUBs of FIG. 3.

FIG. 4 is a graphical representation of proactive sharing between the subscriptions of FIG. 3. A plot 400 is shown depicting and embodiment of network search and results sharing between the first SIM 240 and the second SIM 250 and their respective SUBS 142, 144 over time (t). Time (t) is plotted on the horizontal axis.

The first SIM 240 and the second SIM 250 may have a periodic paging interval or DRX cycle similar to that shown in FIG. 3. In some embodiments, the first SIM 240 (or first SUB) may have a PI 402 and the second SIM 250 (or second SUB) may have a PI 404. The PI 402 and the PI 404 may indicate the time when the first SIM 240 and the second SIM 250 (e.g., their associated processors or the control unit 210) are awake, for example, receiving and decoding a paging message. Five PIs 402 are shown for the first SIM 240, individually labeled with a lowercase letter, as PIs 402a, 402b, 402c, 402d, 402e (collectively PIs 402). Similarly, five PIs 404 are shown for the second SIM 250, individually labeled with a lowercase letter, as PIs 404a, 404b, 404c, 404d, 404e (collectively PIs 404). The DRX cycle of the first SIM 240 may have a first period 406. The DRX cycle of the second SIM 250 may have a second period 408. In some embodiments the first period 406 may be equal to the second period 408. In some other embodiments the first period 406 may be different from the second period 408. The first period 406 and the second period 408 may be, for example, established by the communication networks 120, 130.

The first SIM 240 and the second SIM 250 may have a search timer that may last for one or more DRX cycles. As shown in FIG. 4, a search timer 412 for the first SIM 240 expires every two DRX cycles and a search timer 414 for the second SIM 250 may expire every DRX cycle. It should be appreciated that the search timer and DRX cycles may not coincide and/or may not be equivalent periods of time, depending on the radio access technology and the settings set by the communication networks 120, 130.

As shown at the PI 404a, the search timer 414 may expire every DRX cycle. Accordingly, the second SIM 250 (or its associated processor(s)) may conduct a measurement search at the end of every DRX cycle. Following the PI 404b, the second SIM 250 may conduct a search 410. The second SIM 250 may thus correspond with the "active SUB" because it is conducting a search. The search 410 may be a measurement search (e.g., the MS 306) for known cells. This may include evaluating received signal strength from cells that are known to be available. The search 410 may also be a full availability search for all known and unknown cells, similar to the full search 308 (FIG. 3). In some embodiments, the search 410 may also be a specific service or network search, similar to the LTE search 316 or the GSM search 314 (FIG. 3). The second SIM 250 may record the search results in memory, for example, the storage unit 280 (FIG. 2). The search results may include energy measurements for cells that are known to be available (e.g., the communication networks 120, 130) and for newly discovered cells or networks. The search results may also include nonavailability results, for example, including information regarding cells that were previously available in a prior search but are no longer available or have diminished signal strengths.

The second SIM 250 may then proactively, and without a request from the first SIM 240, share the search results with the first SIM 240 via a sharing action 420. The sharing action 420 may be a message sent from the second SIM 250 (e.g., the second processor) to the first SIM 240 (e.g., the first processor) or other type of signaling. The first SIM 240 may wake up at the next PI 402b and implement the results of the search 410. Thus, the search results may be shared if the passive SUB is awake (WAKE mode), in IDLE, or sleep mode. In some examples, the search results may be proactively shared to the passive SUB when passive SUB is awake (decoding PI) or asleep (waiting to decode next PI).

At the PI 402d, the search timer 412 expires and the first SIM 240 may begin a search 430 because there are no other valid search results to share from the alternate SUB (e.g., corresponding to the second SIM 250). The search 430 may be similar to the search 410, searching for known or unknown cells. The first SIM 240 may then record received energy levels or signal strengths, noting availability or nonavailability of a given cell or network.

The first SIM 240 may then proactively share the results of the search 430 with the second SIM 250 in a sharing action 440. The sharing action 440 may be a message or other signaling similar to the sharing action 420. The sharing action 440 may be, for example, a communication from the first processor to the second processor (within the control unit 210). Therefore the second SIM 250 may omit the search (e.g., the search 410) that would have otherwise occurred at a search opportunity 450.

In summary, the active SUB that is holding lock on a cell and completed the search (e.g., the search 410, the search 430) may share the search results to the passive SUB (e.g., the sharing action 420, 440). If results are shared, the search timer may be reset at the passive SUB. Whenever a search is performed on one SUB, results are shared pro-actively to the alternate SUB at the same time.

Figure 5:
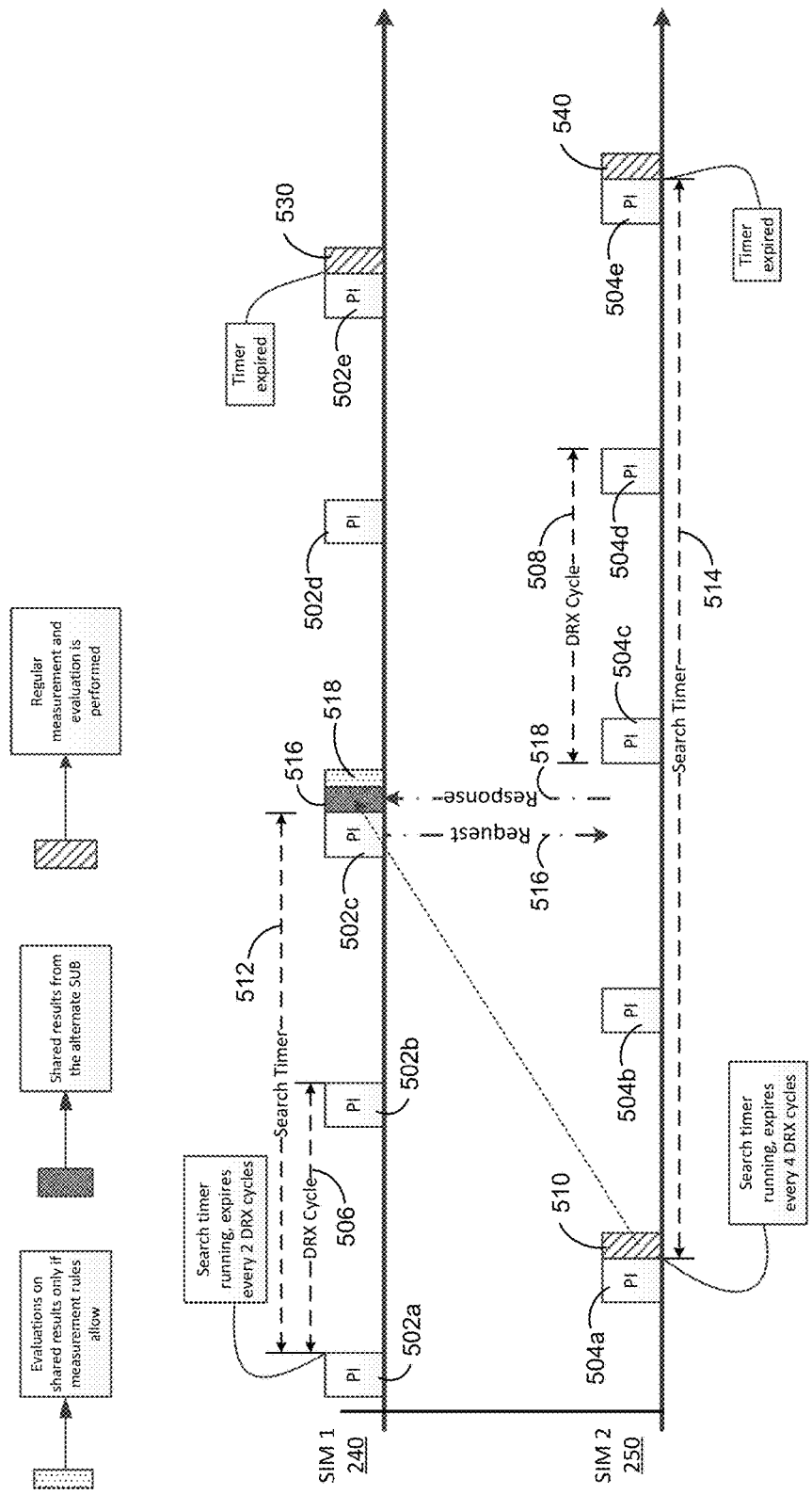
FIG. 5 is a graphical representation of reactive sharing between the SUBs of FIG. 3.

FIG. 5 is a graphical representation of reactive sharing between the subscriptions of FIG. 3. A plot 500 depicts and embodiment of network search and results sharing between the first SIM 240 and the second SIM 250 and their respective SUBs 142, 144 over time (t). Time (t) is plotted on the horizontal axis.

The first SIM 240 and the second SIM 250 may have a periodic paging interval or DRX cycle similar to that shown in FIG. 3 and FIG. 4. In some embodiments, the first SIM 240 may have a PI 502 and the second SIM 250 may have a PI 504. The PI 502 and the PI 504 may indicate the time when the first SIM 240 and the second SIM 250 are awake, for example, receiving and decoding a paging message. Five PIs 502 are shown for the first SIM 240, individually labeled with a lowercase letter, as PIs 502a, 502b, 502c, 502d, 502e (collectively PIs 502). Similarly, five PIs 504 are shown for the second SIM 250, individually labeled with a lowercase letter, as PIs 504a, 504b, 504c, 504d, 504e (collectively PIs 504). The DRX cycle of the first SIM 240 may have a first period 506. The DRX cycle of the second SIM 250 may have a second period 508. In some embodiments the first period 506 may be equal to the second period 508. In some other embodiments the first period 506 may be different from to the second period 508. The first period 506 and the second period 508 may be, for example, established by the communication networks 120, 130. As shown in the exemplary embodiment of the plot 500, the first period 506 is slightly shorter than the second period 508.

The first SIM 240 and the second SIM 250 may have a search timer that may last for one or more DRX cycles. In the embodiment depicted in FIG. 5, a search timer 512 for the first SIM 240 expires every two DRX cycles, for example, beginning at the end of the PI 502a and ending with the PI 502c. While not shown in FIG. 5, a previous search timer would have expired with the PI 502a in such an example. A search timer 514 for the second SIM 250 may expire every fourth DRX cycle, beginning, for example, with the PI 504a and ending with the PI 504e. It should be appreciated that the search timers 512, 514 and DRX cycles may not coincide and/or may not be equivalent periods of time, depending on the radio access technology and the configuration(s) set by the communication networks 120, 130. Each SIM or SUB may have a different DRX cycle length based on the cell on which that each SIM camps. The search timers 512, 514 are shown as even multiples of the periods 506, 508 for ease of description herein, however other multiples or timing is possible.

As shown at the PI 504a, the search timer 514 may expire every fourth DRX cycle, coincident with the end of the PI 504e. Accordingly, the second SIM 250 may need to conduct a measurement search at the end of every fourth DRX cycle unless search results are shared between the first SIM 240 and the second SIM 250. Following the PI 504a, the second SIM 250 may conduct a search 510. The second SIM 250 may thus be considered associated with the "active SUB." The search 510 may be a measurement search (e.g., the MS 306) for known cells. This may include evaluating, by for example, the second processor, received signal strength or other energy from cells that are known to be available. The search 510 may also be a full availability search for all known and unknown cells, similar to the full search 308 (FIG. 3). In some embodiments, the search 510 may also be a specific service or network search, similar to the GSM search 310 or the LTE search 316 (FIG. 3). The second SIM 250 (or for example, its associated second processor at the control unit 210) may record the search results of the search 510 in memory, such as, for example, the storage unit 280 (FIG. 2). The search results may include energy measurements for cells that are known to be available (e.g., the communication networks 120, 130) and for newly discovered cells or networks. The search results may also include nonavailability results, for example, including information regarding cells that were previously available in a prior search but are no longer available or have diminished signal strengths.

The first SIM 240 may wake on the PI 502c and make a request 516 to the second SIM 250 for the search results of the search 510. If the results are valid, then the second SIM 250 may send a response 518 including an indication of the search results of the search 510, similar to the sharing action 420 (FIG. 4). The first SIM 240 may then receive the shared results 516. The first SIM 240 may then evaluate 518 the shared results 516 in lieu of conducting a new search (e.g., the search 510). This may save power for the device 110. The passive SUB (e.g., the first SIM 240) may then also reset the search timer (e.g., the search timer 512). In some examples, the first SIM 240 may determine validity of the search results based on the search timer 512 and the time elapsed for the search timer 514 (of the second SIM 250).

In some embodiments, the search results are valid, and therefore may be shared, if the time since the search is completed is less than the search timer (e.g., the search timer 512) on the passive SUB. In the illustrated example, the first SIM 240 is the passive SUB since it is not performing a search. The second SIM 250 performed the search 510 just after the PI 502a of the first SIM 240, and thus corresponds to the active SUB. Since the time elapsed for the search timer 514 of the second SIM 250 (at the PI 502c) is less than the search timer 512, the search results of the search 510 are valid for the first SIM 240. Accordingly, the first SIM 240 may send the request 512 and use the results of the search 510 instead of conducting a new search and using additional power unnecessarily.

At the PI 502e, the search timer 512 of the first SIM 240 expires again. If the search results of the alternate SIM or the active SIM (e.g., the second SIM 250) are available and valid, the first SIM 240 or an associate processor (e.g., at the control unit) may send another request. However, the most recent search 510 that the second SIM 250 conducted (after the PI 504a) was more than the length of the search timer 512 in the past. Accordingly, the search results from the search 510 are stale and therefore not available for sharing to the first SIM 240. The first SIM 240 may then perform a search 530.

In a similar scenario, at the end of the PI 504e, the search timer 514 expires and the second SIM 250 may attempt to share search results from the alternate SUB (e.g., the first SIM 240). However, here too, the last search performed by the first SIM 240 was prior to the PI 502a (not shown), which is older than the last search timer 514 for the second SIM 250. Accordingly, the search results from the first SIM 240 are not valid for the second SIM 250. The second SIM 250 may then perform a new search 540.

In summary, reactive sharing may allow one SIM (or its associated processor(s)) corresponding to a passive SUB, for example, to query a second SIM corresponding to an alternate SUB for cell search results validity, and then copy the results and resets timer. In some embodiments, the SIM corresponding to the active SUB (or its associated processor) may query another SIM corresponding the passive SUB (or its associated processor). Measurement results may be shared across SUBs when the search results for the alternate SUB pass the results validity check as described above. If the validity check fails, SIM associated with the active SUB performs a new search.

Figure 6:
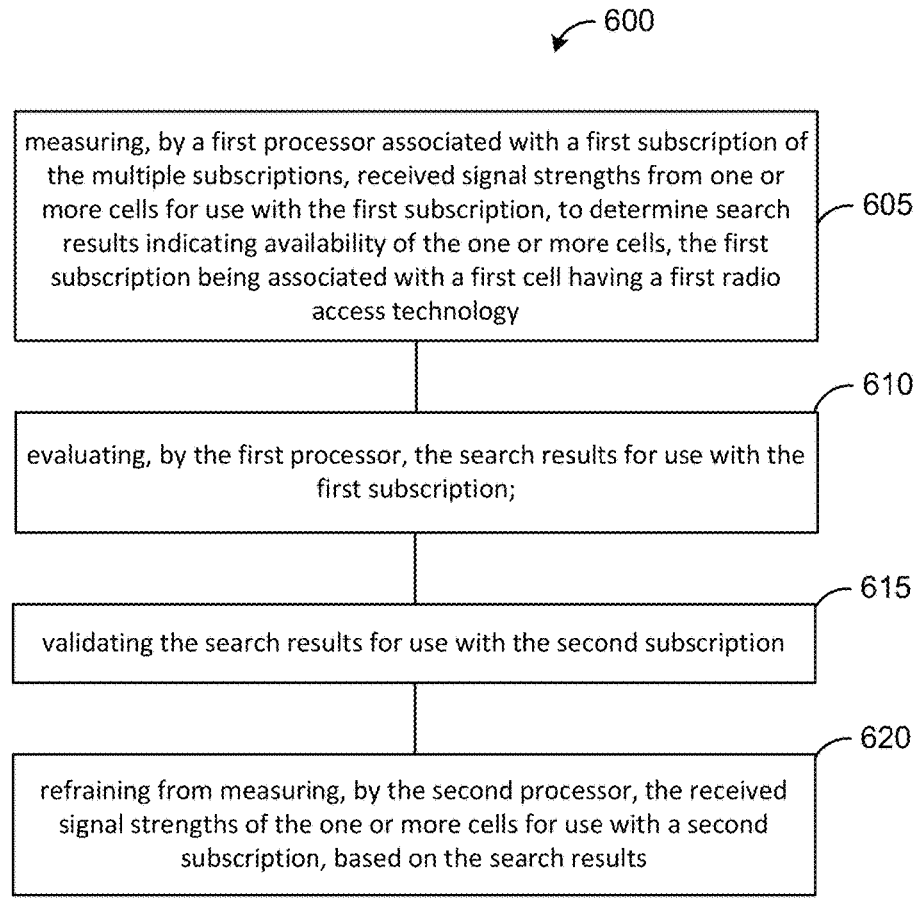
FIG. 6 is a flowchart of a method for sharing measurement results in multi-sim devices.

FIG. 6 is a flowchart of a method for sharing measurement results between the SUBs of FIG. 3. A method 600 may begin at block 605. At block 605, a first processor associated with a first SUB of the multiple SUBs may measure received signal strengths from one or more cells for use with the first SUB. The cell search may determine search results indicating availability of the one or more cells. The first SUB may be associated with a first cell (e.g., the first BS 122 or the second BS 124) having a first radio access technology. As noted above, an active SUB may measure received signal strength from one or more cells within range of the device 110. The active SUB may be the first SUB 142 associated with the first SIM 240 or the second SUB 144 associated with the second SIM 250 depending on which is conducting a measurement search (e.g., the MS 306), a full search (e.g., the full search 308), or a cell-specific search (e.g., the GSM search 310, the LTE search 316). The search results may include an indication of received signal strength of the available cells or other measurable energy and an identity of the available cells. The search results may also include negative results, for example, when a known cell is no longer available due to a change in status (e.g., open or closed subscriber groups), reduced signal strength (e.g., RSSI), or QoS.

At block 610, the first processor may evaluate the search results for use with the first SUB. In some embodiments, the active SUB, for example, the SUB conducting the search may determine validity of the search results. This is similar to above, where the first SUB 240 determines validity of the search results based on the search timer 512 and the time elapsed for the search timer 514 since the PI 504a, for example.

The active SUB may also share the results of the measurement search (e.g., the MS 306), the full search (e.g., the full search 308), or the cell-specific search (e.g., the GSM search 310, the LTE search 316) results with the passive SUB. The sharing may be proactive, whereby the active SUB (or its associated first processor) shares the search results with the passive SUB (or its associated second processor) autonomously or automatically (e.g., FIG. 4). The sharing may be accomplished even when the passive SUB is in IDLE mode. The sharing may also be reactive, whereby the processor associated with the passive SUB makes a request to the active SUB for the search results (e.g., FIG. 5).

At block 615, the search results may be validated for use with the second SUB. Validity of the search results may be a condition for sharing the results. For example, the search results may be shared when the results of the search(es) are valid for use the second SUB. The search results will be valid when the age of the search results is less than the search timer for the SUB receiving the shared results. The control unit 210 (e.g., the first processor or the second processor) may validate the search results for sharing.

The proactive or reactive sharing may be conducted when the first and second SUBs are in the CONNECTED mode or when they are in the IDLE mode. The active SUB and the passive SUB do not have to be in the same mode in order to share the search results.

In some embodiments, the active SUB may be camped on a first cell with a first radio access technology while the passive SUB is camped on a second cell with a second radio access technology. The method 600 may be implemented in situations in which the first and second cells use the same radio access technology and when the first and second cells use different radio access technologies.

At block 620, the second processor may refrain from measuring the received signal strengths of the one or more cells for use with a second SUB, based on the search results shared from the active SUB. Thus, the passive SUB may dispense with conducting its own cell search because it has access to the searches conducted by the active SUB. Therefore, the method 600 may aid in power conservation, requiring fewer cell searches by both the active and passive SUBs in the multi-SIM device 110 having two or more SUBs.

The accompanying claims and their equivalents are intended to cover such forms or modifications as would fall within the scope of the disclosure. For instance, the example apparatuses, methods, and systems disclosed herein may be applied to multi-SIM wireless devices subscribing to multiple communication networks and/or radio access or communication technologies. The various components illustrated in the figures may be implemented as, for example, but not limited to, software and/or firmware on a processor or dedicated hardware. Also, the features and attributes of the specific example embodiments disclosed above may be combined in different ways to form additional embodiments, all of which fall within the scope of the disclosure.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an," or "the" is not to be construed as limiting the element to the singular.

The various illustrative logical blocks, modules, and algorithm operations described in connection with the embodiments disclosed herein may be implemented as electronic hardware, computer software, or combinations of both. To clearly illustrate this interchangeability of hardware and software, various illustrative components, blocks, modules, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present inventive concept.

The hardware used to implement the various illustrative logics, logical blocks, and modules described in connection with the various embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include random access memory (RAM), read-only memory (ROM), electrically erasable programmable read-only memory (EEPROM), FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method for reducing power consumption in a mobile communication device having multiple subscriber identity modules (SIMs), each SIM of the multiple SIMs being associated with a subscription, the method comprising:

measuring, by a first processor associated with a first subscription, received signal strengths from one or more cells for use with the first subscription, to determine search results indicating availability of the one or more cells, the first subscription being associated with a first cell having a first radio access technology;

sharing the search results with a second processor associated with a second subscription, the second subscription being associated with a second cell having a second radio access technology;

validating the search results for use with the second subscription if a time at which the measuring was completed is within a time period of a search timer associated with the second subscription; and refraining from measuring, by the second processor, the received signal strengths of the one or more cells for use with the second subscription, based on the validated search results.

2. The method of claim 1, wherein the search timer is based on a discontinuous reception (DRX) cycle of the second cell on which the second subscription is camped.

3. The method of claim 1 further comprising requesting, by the second processor, the search results from the first processor.

4. The method of claim 1 wherein the search results further indicate a nonavailability of the one or more cells.

5. The method of claim 1 wherein each SIM of the multiple SIMs corresponds to a single subscription.

6. The method of claim 1 further comprising processing, by the second processor, the search results for use with the second subscription when the second subscription is in one of an IDLE mode and a CONNECTED mode.

7. The method of claim 1 wherein at least a portion of the one or more cells are previously known to the device.

8. The method of claim 1 wherein the first radio access technology and the second radio access technology are the same.

9. The method of claim 1 wherein the first radio access technology and the second radio access technology are different.

10. A device for reducing power consumption in a mobile communication device having multiple subscriber identity modules (SIMs), each SIM of the multiple SIMs being associated with a subscription, the device comprising:
 a first processor operable to
  measure received signal strengths from one or more cells for use with a first subscription, to determine search results indicating availability of the one or more cells, the first subscription being associated with a first cell having a first radio access technology, and
  share the search results for use with a second subscription, the second subscription being associated with a second cell having a second radio access technology; and
 a second processor operable to
  validate the search results for use with the second subscription if a time since the measuring was completed by the first processor is less than a period of a search timer associated with the second subscription, and
  refrain from measuring the received signal strengths of the one or more cells for use with the second subscription, based on the validated search results.

11. The device of claim 10, wherein the search timer is based on a discontinuous reception (DRX) cycle of the second cell on which the second subscription is camped.

12. The device of claim 10 wherein the second processor is operable to transmit a message indicating a request to share the search results from the first processor.

13. The device of claim 10 wherein the search results further indicate a nonavailability of the one or more cells.

14. The device of claim 10 wherein each SIM of the multiple SIMs corresponds to a single subscription.

15. The device of claim 10 wherein the second processor is further operable to process the search results for use with the second subscription when the second subscription is in one of an IDLE mode and a CONNECTED mode.

16. The device of claim 10 wherein at least a portion of the one or more cells are previously known to the device.

17. The device of claim 10 wherein the first radio access technology and the second radio access technology are the same.

18. The device of claim 10 wherein the first radio access technology and the second radio access technology are different.

19. An apparatus for reducing power consumption in a mobile communication device having multiple subscriber identity modules (SIMs), each SIM of the multiple SIMs being associated with a subscription, the apparatus comprising:
 means for measuring received signal strengths from one or more cells for use with a first subscription, to determine search results indicating availability of the one or more cells, the first subscription being associated with a first cell having a first radio access technology;
 means for sharing the search results for use with a second subscription, the second subscription being associated with a second cell having a second radio access technology;
 means for validating the search results for use with the second subscription if a time since the measuring was completed is less than a period of a search timer associated with the second subscription; and
 means for refraining from measuring the received signal strengths of the one or more cells for use with the second subscription, based on the validated search results.

20. The apparatus of claim 19 further comprising means for requesting that the search results for the first subscription are shared for use with the second subscription.

21. The apparatus of claim 19, wherein the means for measuring, the means for sharing, and the means for validating comprise one or more processors associated with one or more of the first subscription and the second subscription.

22. A nontransitory computer-readable medium for reducing power consumption in a mobile communication device having one or more processors associated with multiple subscriber identity modules (SIMs), each SIM of the multiple SIMs being associated with a subscription, the nontransitory computer-readable medium containing instructions that when executed by the one or more processors causes the device to:
 measure received signal strengths from one or more cells for use with a first subscription, to determine search results indicating availability of the one or more cells, the first subscription being associated with a first cell having a first radio access technology;
 make the search results available for use with a second subscription, the second subscription being associated with a second cell having a second radio access technology;
 validate the search results for use with the second subscription if a time since the measuring was completed is less than a period of a search timer associated with the second subscription, and
 refrain from measuring the received signal strengths of the one or more cells for use with the second subscription, based on the validated search results.

23. The nontransitory computer-readable medium of claim 22, wherein the search timer is based on a discontinuous reception (DRX) cycle of the second cell on which the second subscription is camped.

24. The nontransitory computer-readable medium of claim 22 wherein the search results further indicate a nonavailability of the one or more cells.

* * * * *